US006869244B2

(12) United States Patent
Anderton et al.

(10) Patent No.: US 6,869,244 B2
(45) Date of Patent: Mar. 22, 2005

(54) ARTICULATED PIN JOINT FOR A TRACK CHAIN

(75) Inventors: Peter W. Anderton, Peoria, IL (US); Daniel D. Angot, Dunlap, IL (US); Steve L. Arianoutsos, Washington, IL (US); J. Christopher Barnes, Grenoble (FR); David G. Kupper, Edelstein, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/321,245

(22) Filed: Dec. 17, 2002

(65) Prior Publication Data

US 2004/0114993 A1 Jun. 17, 2004

(51) Int. Cl.⁷ .......................... B62D 55/20; B62D 55/14
(52) U.S. Cl. .................... 403/150; 403/37; 403/159; 305/117; 305/118; 184/105.3
(58) Field of Search ................... 403/150, 159, 403/37; 305/118, 117; 184/105.3; 411/607, 616, 630, 637

(56) References Cited

U.S. PATENT DOCUMENTS

| | | | |
|---|---|---|---|
| 3,762,778 A | | 10/1973 | Boggs et al. |
| 3,829,173 A | * | 8/1974 | Stedman ................. 305/116 |
| 3,831,240 A | * | 8/1974 | Boggs et al. ............ 53/489 |
| 3,924,904 A | | 12/1975 | Wagner et al. |
| 3,958,836 A | | 5/1976 | Brown et al. |
| 3,963,047 A | | 6/1976 | Moring |
| 3,987,706 A | | 10/1976 | Corrigan |
| 4,030,178 A | | 6/1977 | Luebkemann |
| 4,067,414 A | * | 1/1978 | Funke ..................... 184/105.3 |
| 4,120,537 A | | 10/1978 | Roley et al. |
| 4,146,053 A | | 3/1979 | Corrigan |
| 4,191,431 A | * | 3/1980 | Roley et al. ............. 305/118 |
| 4,251,182 A | * | 2/1981 | Schroeder ............... 403/158 |
| 4,398,862 A | * | 8/1983 | Schroeder ............... 403/154 |
| 4,438,981 A | * | 3/1984 | Harms .................... 305/118 |
| 4,456,041 A | * | 6/1984 | Grilli et al. .............. 53/264 |
| 4,575,914 A | * | 3/1986 | Armida et al. .......... 305/104 |
| 4,582,366 A | * | 4/1986 | Burfield et al. ......... 305/117 |
| 5,044,812 A | * | 9/1991 | Ardelt et al. ............ 403/154 |
| 5,069,509 A | * | 12/1991 | Johnson et al. ......... 305/118 |
| 5,165,765 A | | 11/1992 | Baylor |
| 5,207,293 A | | 5/1993 | Eden et al. |
| 5,829,850 A | * | 11/1998 | Ketting et al. .......... 305/194 |
| 5,921,419 A | | 7/1999 | Niedospial, Jr. et al. |
| 6,042,295 A | * | 3/2000 | Barden .................... 403/150 |
| 6,079,519 A | | 6/2000 | Lottes |

FOREIGN PATENT DOCUMENTS

| | | | | |
|---|---|---|---|---|
| EP | 43354 A2 | * | 1/1982 | ........... B62D/55/20 |
| GB | 2288376 A | * | 10/1995 | ........... B62D/55/14 |

* cited by examiner

Primary Examiner—Daniel P. Stodola
Assistant Examiner—Ernesto Garcia
(74) Attorney, Agent, or Firm—Jeff A Greene

(57) ABSTRACT

An improved articulated pin joint for a track chain used on track laying work machines is provided. The articulated pin joint includes a plug positioned in a central cavity of a track pin. The plug includes an axial passage in which a needle can be inserted to inject grease into the central cavity. The invention facilitates replenishing grease in the field without removing the track chain from the track laying work machine.

3 Claims, 3 Drawing Sheets

ARTICULATED PIN JOINT FOR A TRACK CHAIN

TECHNICAL FIELD

The present invention relates to track chains for track laying work machine, and more particularly to an articulated pin joint of such a track chain.

BACKGROUND

In operation, track laying work machines are subject to some of the most severe operating environments. In particular, the track chain assemblies of such work machines operate in continuous contact with abrasive, and occasionally corrosive, soil environments. Such track assemblies include pin and bushing joints positioned between adjacent pairs of track links to hingably couple the pairs of links. Each pair of links, in turn, carry ground-engaging track shoes. The pin and bushing joints are subject to extreme wear from the abrasive and corrosive soil environment and incur high stresses through the support of the track laying work machine and the engagement with drive sprockets.

Attempts have been made to increase service life of such track assemblies by improved metallurgy, factory sealing, lubrication of the joints, and by providing factory-assembled joints in serviceable form. Examples of such designs are disclosed in U.S. Pat. No. 3,958,836 issued to Brown on May 25, 1976 and U.S. Pat. No. 3,762,778 issued to Boggs et al on Oct. 2, 1973 that have proved effective in obtaining increased component life.

The arrangement disclosed in Brown, however, has a high production cost due to drilling a hole through the pin, tapping both ends, plugging one end and counter boring the opposite end and then placing a fitting in the counter bore. The counter bore is an attempt to protect the fitting by placing the fitting deeper within the pin. However, this arrangement allows material to collect in the void around the fitting and erode the fitting. At a minimum the material build up will compact and harden, which will require cleaning before replacement lubricant can be injected into the pin.

Boggs, on the other hand, discloses a much more efficient design that uses an elastomeric stopper placed in one end of a track pin. The stopper has a through hole in which oil is injected and an additional plug that is positioned in the through hole of the stopper to retain the fluid. However, this design requires the track to be removed from the machine and placed on its side to effectively fill the hollow pin with oil. Excess air is then allowed to escape through a passage in the stopper. A second stopper is then positioned in the passage to retain the oil.

The present invention is directed to overcome one or more of the problems as set forth above.

SUMMARY OF THE INVENTION

In one aspect of the present invention an articulated pin joint is provided for a track chain. The articulated pin joint includes a track pin defining a longitudinal axis and having an outer surface. A central cavity is positioned within the track pin. A cross bore extends from the outer surface to the central cavity. A bushing having an inner surface disposed about the outer surface of the track pin. A plug is positioned within the central cavity of the pin and has an axial passage extending therethrough.

DETAILED DESCRIPTION

Figure 1:
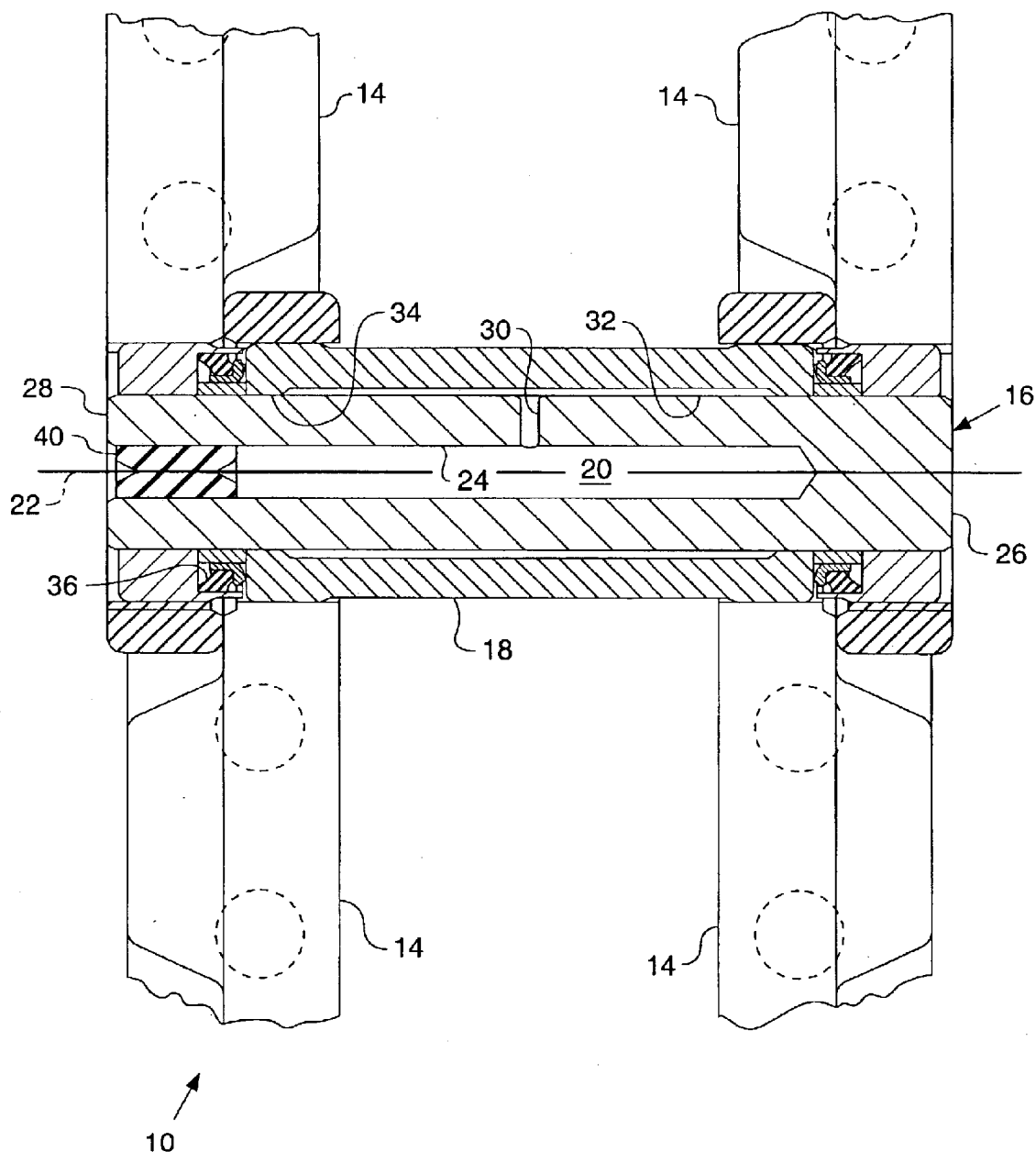
FIG. 1 is a plan view in partial cross section of a hinge joint and a portion of a track chain.

Referring to the drawings and in particular FIG. 1, a track chain 10, a portion of which is shown, includes a plurality of ground-engaging track shoes (not shown) each of which are fixedly secured to a pair of spaced, parallel, track links 14 by fasteners. Each pair of track links 14 is pivotally connected, by way of a track pin 16 and a complementing coaxially disposed bushing 18, to an adjacent pair of links 14 so that an articulated pin joint 19 is formed. The track chain 10 is entrained over a drive sprocket and at least one idler, disposed on opposite sides of a track-laying work machine (none of which are shown), in a known manner for transferring motive power to the track chain 10.

Track pin 16 includes a central cavity 20 concentrically positioned about a longitudinal axis 22. A bore 24 extends a predetermined distance through the track pin 16 to define a closed-end portion 26 at one end and an open-end portion 28 at the other end to form the central cavity 20. Central cavity 20 contains a supply of lubricant, which in this example is preferably grease. It should be understood that any of a number of alternate configurations of the track pin 16 are contemplated for defining the central cavity 20. For example, the track pin 16 may have a bore that runs the entire axial length of the track pin 16, or have a bore extending from each end with a closed portion centrally located to define a cavity at each end of the track pin 16 without departing from the gist of the present invention.

At least one cross bore 30 extends from an outer surface 32 of the track pin 16 to the central cavity 20. Cross bore 30 is positioned so that a supply of grease is fed in any suitable manner to lubricate the outer surface 32 of the track pin 16 and an inner surface 34 of the bushing 18. A pair of suitable seals 36 are normally provided in the vicinity of each end of the bushing 18 to minimize loss of grease and to prevent entry of foreign matter.

Figure 2:
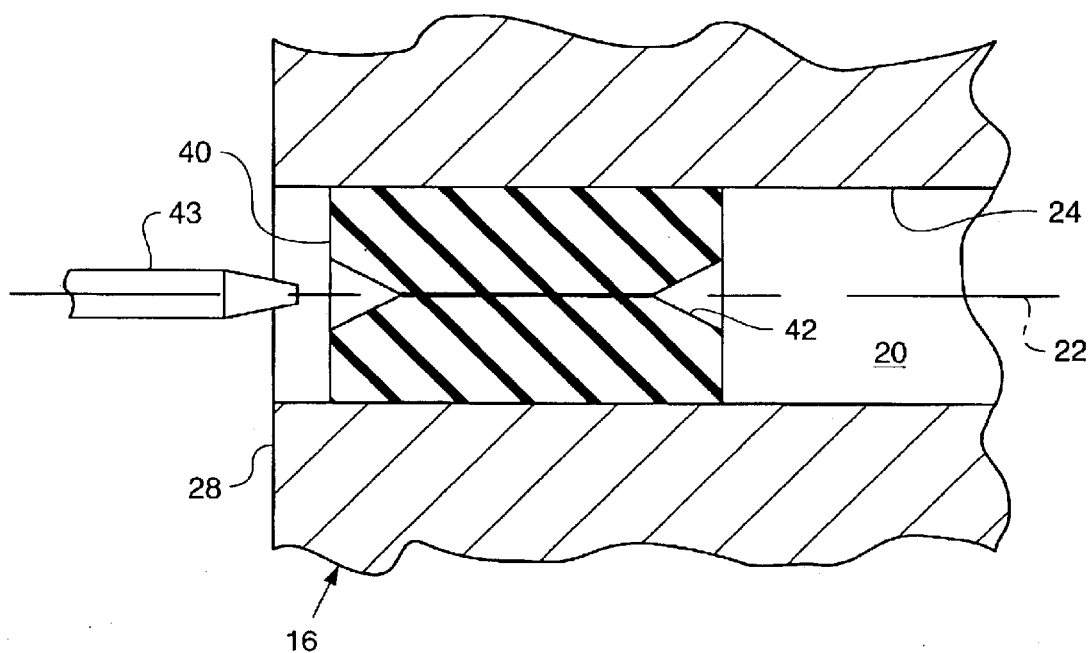
FIG. 2 shows a sectional view of the hinge joint shown in FIG. 1.

Now referring to FIG. 2, a plug 40, made from a non-metallic flexible material is disposed in the open-end portion 28 of track pin 16. Plug 40 is preferably an elastomeric material and has a predetermined diameter slightly larger than the bore 24 of the central cavity 20 so as to create an interference fit for retaining the plug within the bore 24. Alternatively, the plug 40 may have a tapered exterior so that the interference fit increases as the plug 40 is positioned within the central cavity 20 or positioned in threads or serrations in the bore 24 of the track pin 16. An axial passage 42 extends through the plug 40 coaxial with the longitudinal axis 22 so that a grease injection tool 43, seen in FIG. 2, can be used to fill the central cavity 20 with grease.

Figure 3:
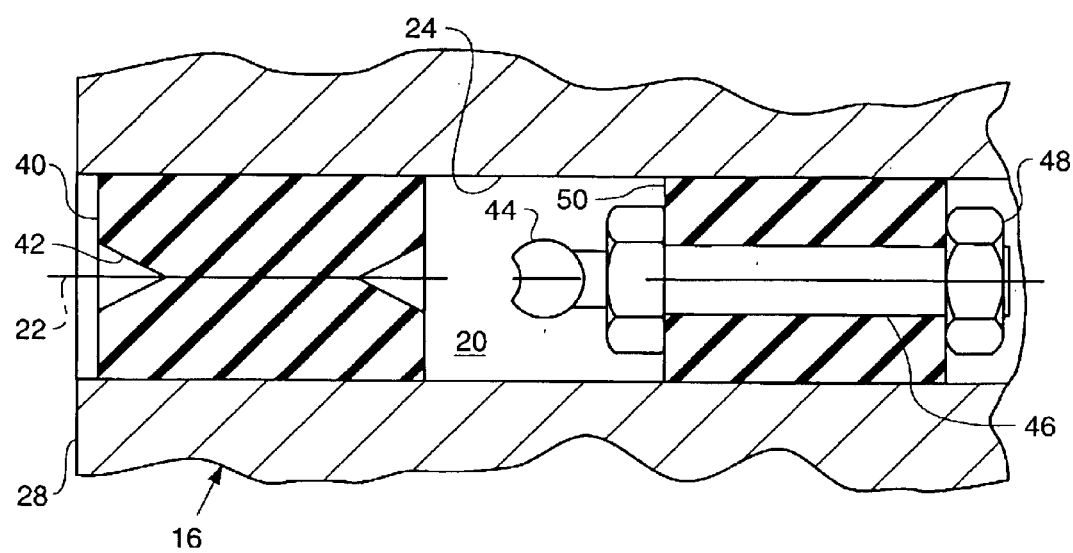
FIG. 3 shows a sectional view of an alternate embodiment of a hinge joint.

As shown in FIG. 3, alternatively, a grease fitting/zerk 44 may be positioned inward from the open-end portion 28 behind the plug 40. The grease zerk 44 is shown as having a conduit 46 extending from one end with a retainer 48 positioned at the distal end of conduit 46. An elastomeric stop 50 is disposed about the conduit 46 between the retainer 48 and the grease zerk 44. Elastomeric stop 50 may be made from other suitable materials that have similar flexible and compressible properties. The retainer 48 is tightened to retain the grease fitting 46 captive within the stopper 50. Additionally, the grease zerk 44 may be positioned in a threaded hole in the bore 24 or other similar arrangement for fixedly securing the position of the zerk 44.

INDUSTRIAL APPLICABILITY

During assembly of the track chain 10 the bushings 18 are positioned about the track pins 16 with adjacent pairs of links 14 pressed onto the pins 16 or other members in a known manner. The track shoes (not shown) are fastened to each pair of adjacent links 14. The free ends of the track chain 10 are then attached together by master links (not shown) in the usual known manner.

The track pins 16 may have the plugs 40 pre-positioned in the open-end portion 28 or inserted after the track chain 10 is fully assembled. The diameter or shape of the plug 40 is configured so as not only to retain the plug within the open-end portion 28 but to also close off the axial passage 42 in the plug 40 by compressive force. The grease injection tool 43 is inserted into the axial passage 42 of the plug 40 and fills the central cavity 20 with grease. The cross bore 30 allows grease to flow to the outer surface 32 of the track pin 16 and the inner surface of the bushing 18 and the seals 36. When enough grease has been injected into the central cavity 20 the needle is withdrawn from the axial passage 42. Axial passage 42 then closes with a force sufficient to retain the grease within the central cavity 20 as well as keeping foreign material from entering through the axial passage 42. This step can be repeated in the field without having to remove the track chain 10.

In the alternative arrangement shown in FIG. 3, the plug 40 acts to protect the grease zerk 50 during operation. To replenish the supply of grease a probe or needle is inserted through the axial passage 42. The plug 40 is then pulled from the bore 24 of the central cavity 20 and grease can then be injected into the grease zerk 44. The plug 40 is then reinserted back into the bore 24.

It should be clearly understood that the present articulated pin joint 19 allows for lubricant to be injected in the central cavity 20 of the track pin 16 at a job site during routine maintenance operations. Therfore, lubricant may be re-injected at numerous intervals without removing the machine from the job site or removal of the track chain 10 thereby saving time and money.

What is claimed is:

1. An articulated pin joint for a track chain, the articulated pin joint comprising:

a track pin defining a longitudinal axis, said track pin having an outer surface, a central cavity extending inwardly from one end along the longitudinal axis and being closed at the other end, and a cross bore extending from said outer surface to said central cavity;

a bushing having an inner surface being disposed about said outer surface of said track pin;

a plug being positioned within said central cavity of said track pin generally adjacent the one end of the track pin, said plug having an axial passage extending therethrough which is compressingly closed when said plug is positioned within said central cavity; and a grease zerk assembly is disposed in the central cavity between the plug and the cross bore.

2. The articulated pin joint of claim 1, wherein said plug seals said grease zerk assembly from foreign material.

3. The articulated pin joint of claim 2, wherein said plug is made of an elastomeric material.

\* \* \* \* \*